US008132182B2

(12) United States Patent
Perzy et al.

(10) Patent No.: US 8,132,182 B2
(45) Date of Patent: Mar. 6, 2012

(54) PARALLEL PROCESSING OF TRIGGERING RULES IN SIP EVENT NOTIFICATION FILTERS

(75) Inventors: Gil Perzy, Holon (IL); Haim Schneider, Ramot Meir (IL); Dror Yaffe, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 1102 days.

(21) Appl. No.: 11/966,050

(22) Filed: Dec. 28, 2007

(65) Prior Publication Data

US 2009/0172700 A1 Jul. 2, 2009

(51) Int. Cl.
*G06F 3/00* (2006.01)

(52) U.S. Cl. ........................................................ 719/318
(58) Field of Classification Search .................... 719/318
See application file for complete search history.

(56) References Cited

U.S. PATENT DOCUMENTS

| 7,668,802 | B2* | 2/2010 | Bou-Diab et al. | ............ | 707/708 |
| 2003/0187992 | A1 | 10/2003 | Steenfeldt et al. | | |
| 2005/0232401 | A1* | 10/2005 | Ordille et al. | ............ | 379/88.22 |
| 2006/0041579 | A1* | 2/2006 | Miyashita et al. | ............ | 707/102 |

OTHER PUBLICATIONS

Dan Suciu, From Searching Text to Quering XML Streams, 2002.*
Keerat Jittrawong et al.; "Optimizing XPath Queries on Streaming XML Data"; Source: crpit.com/confpapers/CRPITV63Jittrawong. pdf, Conferences in Research and Practice in Information Technology (CRPIT), vol. 63, 2007.
Prakash Ramanan; "Evaluating an XPath Query on a Streaming XML Document"; Source: iiit.net/comad2005b/papers/comad2005b_4.pdf, India, Dec. 20-22, 2005.
Guogen Zhang et al.; "Quick XScan: Efficient Streaming XPath Evaluation"; Source: ucmss.com/books/LFS/CSREA2006/ICM4847.pdf.

* cited by examiner

*Primary Examiner* — Lechi Truong
(74) *Attorney, Agent, or Firm* — Sughrue Mion, PLLC

(57) ABSTRACT

A system for processing triggering rules in SIP event notification filters, including an XPath processor configured to collect a set of XPath expressions from at least one trigger of at least one SIP event notification filter of at least one subscribers in a set of subscribers who are subscribed to state information of a resource, and create a merged finite state automaton having a plurality of nodes and transitions that collectively represent the combination of the XPath expressions, and a streaming parser configured to parse previously-published state information of the resource and newly-published state information of the resource, and stream parsing events of the parsed information to the XPath processor, where the XPath processor is configured to employ the automaton to perform a streaming evaluation of the XPath expressions in parallel to determine which nodes of the parsed information satisfies any of the XPath expressions represented by the automaton.

13 Claims, 3 Drawing Sheets

PARALLEL PROCESSING OF TRIGGERING RULES IN SIP EVENT NOTIFICATION FILTERS

FIELD OF THE INVENTION

The present invention relates to computer-based messaging in general, and more particularly to publish/subscribe messaging using the Session Initiation Protocol (SIP).

BACKGROUND OF THE INVENTION

The Session Initiation Protocol (SIP) is a protocol for creating, modifying, and terminating computer network-based communication sessions, such as for an Internet-based telephone call between two or more participants. Since its introduction numerous enhancements to SIP have been proposed, including a SIP event notification framework in which SIP is used to send notifications to a subscriber regarding changes in a resource's state information as detected by a presence server when new state information for the resource is published. Further enhancements, such as those described in RFCs 4660 and 4661 of the Internet Engineering Task Force, provide a mechanism for filtering such notifications through the use of filtering rules optionally having one or more "trigger" elements that specify what resource state changes must occur before a notification is sent, and optionally having one or more "what" elements that specify the content of a notification. For example, a trigger may specify that a notification be sent when a resource's "sphere" (role) attribute has changed to "work", while a "what" may specify that only the portion of the resource's state information related to the resource's available communication means be included in the notification. Where a filter has a trigger without a "what", if the trigger condition is met, all of the resource's presence information is sent in the notification. Where a filter has a "what" without a trigger, the specified presence information notification is sent following any change in the resource's state information. Each trigger element includes one or more "changed," "added," and "removed" elements describing specific types of state change conditions that are to be evaluated by the presence server when new state information for a resource is published, where the presence server compares the new state information with the resource's previous state information.

When new resource state information is published, the presence server must evaluate all of the filtering rules of all of the subscriptions to a resource. As resource state information is typically embodied in an XML document, triggers typically employ XPath expressions to indicate the location of state information within the XML document that is to be evaluated. Thus, to evaluate the triggers in all the filtering rules, the presence server must evaluate all their XPath expressions in both the newly-published XML document, as well as the previous XML document, as each "changed," "added," and "removed" element requires that its associated XPath expression be evaluated for both documents in order to allow a comparison to be made between the documents. Unfortunately, as the numbers of subscribers, filters, triggers, and XPath statements grow, the presence server requires more and more processing power in order to perform these XPath evaluations.

One approach to evaluating such filters involves processing the subscriptions one at a time, where for each subscription that has filtering rules, and for each trigger of a filtering rule, the presence server evaluates the trigger for the resource's new and previous XML state information documents. If the trigger condition is satisfied, the presence server applies the filter's "what" elements to the new document and sends out a notification with the "what"-specified information to the subscriber. The evaluation of triggers in this approach may be performed using the Document Object Model (DOM), where both the previous and new XML documents are parsed using a DOM parser to create separate DOM trees upon which each XPath expression is evaluated. This approach can be optimized by reusing the DOM trees of the previous and new XML documents for all XPath evaluations of all subscription for the same resource. This approach may be further optimized by caching the results of XPath searches such that if a particular XPath expression is repeated in more than one filter, it need only be evaluated once. However, even with these optimizations, performing XPath searches on DOM trees is processing-intensive.

Another variation of the above sequential processing approach involves using a streaming parser to evaluate XPath expressions, such as a parser that uses the Simple API for XML (SAX). The SAX model is believed to be more efficient than the DOM model in terms of memory usage and processing requirements for evaluating XPath expressions. However, in order to evaluate the SIP filters described above, current techniques call for the streaming XPath evaluation to be repeated for each XPath expression across all filters, giving sequential evaluation with the SAX model little or no advantage over that of the DOM-model.

SUMMARY OF THE INVENTION

The present invention in embodiments thereof discloses a novel approach to processing triggering rules in SIP event notification filters where all the filters across all subscriptions are processed in parallel instead of handling the subscriptions sequentially. This allows for a significant optimization in the processing of filters. For filters that express triggers as XPath expressions, all the XPath expressions across all filters of all the subscriptions are evaluated in parallel using a streaming parallel XPath evaluation algorithm. A single path over an XML document evaluates all the XPath expressions, using significantly less memory and processor resources than the sequential evaluation of XPath expressions require.

In one aspect of the present invention a system is provided for processing triggering rules in SIP event notification filters, the system including an XPath processor configured to collect a set of XPath expressions from at least one trigger of at least one SIP event notification filter of at least one subscribers in a set of subscribers who are subscribed to state information of a resource, and create a merged finite state automaton having a plurality of nodes and transitions that collectively represent the combination of the XPath expressions, and a streaming parser configured to parse previously-published state information of the resource and newly-published state information of the resource, and stream parsing events of the parsed information to the XPath processor, where the XPath processor is configured to employ the automaton to perform a streaming evaluation of the XPath expressions in parallel to determine which nodes of the parsed information satisfies any of the XPath expressions represented by the automaton.

In another aspect of the present invention a system is provided for processing triggering rules in SIP event notification filters, the system including an XPath processor configured to collect a set of XPath expressions from at least one trigger of at least one SIP event notification filter of at least one subscribers in a set of subscribers who are subscribed to state information of a resource, and create a merged finite state automaton having a plurality of nodes and transitions that collectively represent the combination of the XPath expressions, and a streaming parser configured to parse previously-published state information of the resource and newly-published state information of the resource, and stream parsing events of said parsed information to said XPath processor, where the XPath processor is configured to employ said automaton to perform a streaming evaluation of the XPath expressions in parallel to determine which nodes of said parsed information satisfies any of said XPath expressions represented by the automaton, and where the XPath processor is configured to derive a value from either of the previously-published state information and the newly-published state information, the value being associated with said any of the XPath expressions, and a trigger condition evaluator configured to evaluate, for any of the filters, all of the values of all of the trigger conditions that determine whether a notification is to be sent, and compose and send the notification if the evaluated trigger conditions are met.

In another aspect of the present invention a method is provided for processing triggering rules in SIP event notification filters, the method including collecting a set of XPath expressions from at least one trigger of at least one SIP event notification filter of at least one subscribers in a set of subscribers who are subscribed to state information of a resource, creating a merged finite state automaton having a plurality of nodes and transitions that collectively represent the combination of the XPath expressions, parsing previously-published state information of the resource and newly-published state information of the resource, and employing the automaton to perform a streaming evaluation of the XPath expressions in parallel to determine which nodes of the parsed information satisfies any of the XPath expressions represented by the automaton.

In another aspect of the present invention a computer program is provided embodied on a computer storage medium, the computer program including a first code segment operative to collect a set of XPath expressions from at least one trigger of at least one SIP event notification filter of at least one subscribers in a set of subscribers who are subscribed to state information of a resource, a second code segment operative to create a merged finite state automaton having a plurality of nodes and transitions that collectively represent the combination of the XPath expressions, a third code segment operative to parse previously-published state information of the resource and newly-published state information of the resource, and a fourth code segment operative to employ the automaton to perform a streaming evaluation of the XPath expressions in parallel to determine whether any nodes of the parsed information satisfies any of the XPath expressions represented by the automaton.

BRIEF DESCRIPTION OF THE DRAWINGS

The present invention in embodiments thereof will be understood and appreciated more fully from the following detailed description taken in conjunction with the appended drawings in which.

DETAILED DESCRIPTION OF THE INVENTION

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

Figure 1A:
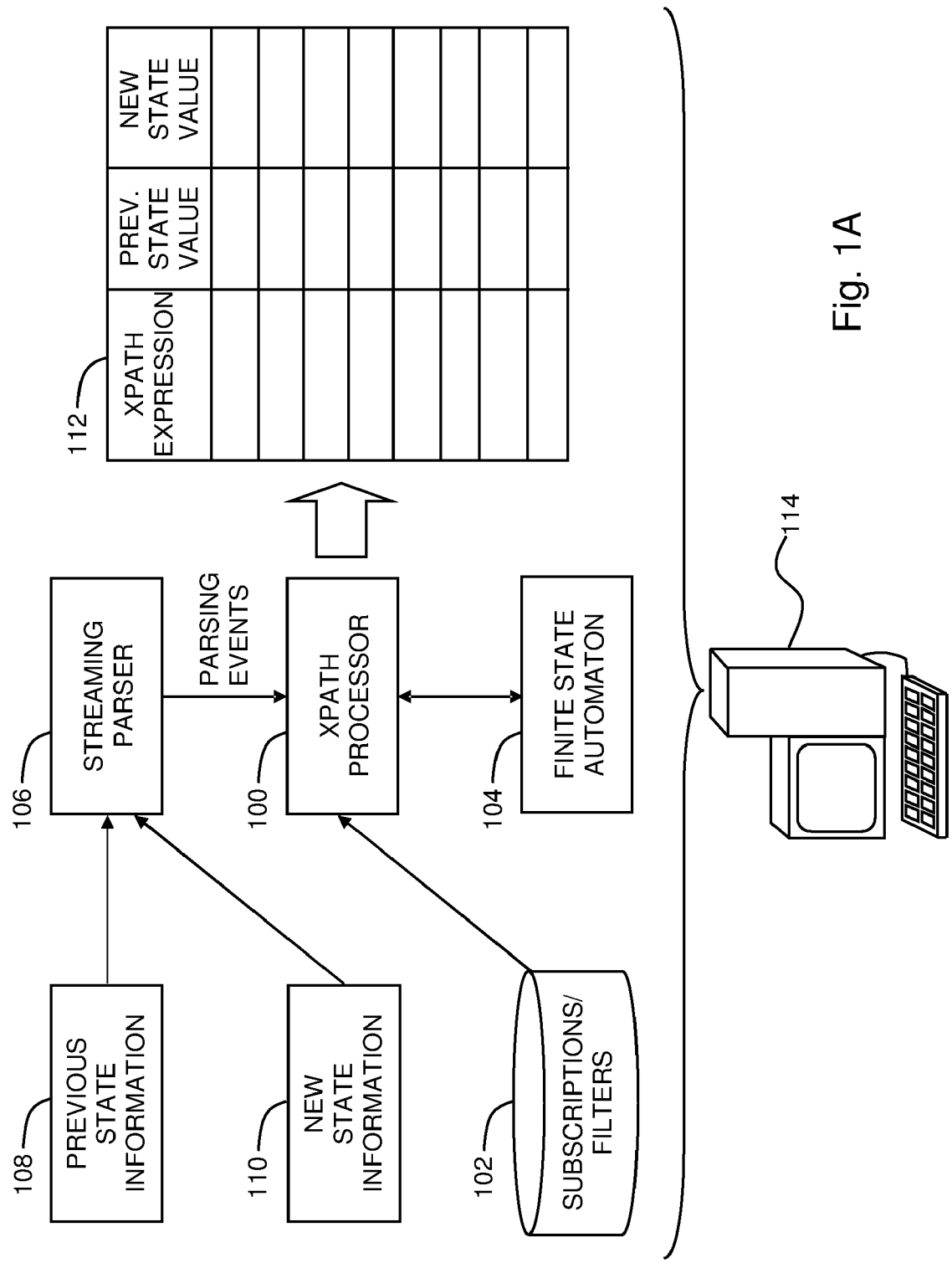
FIGS. 1A and 1B, taken together, is a simplified conceptual illustration of a system for processing triggering rules in SIP event notification filters, constructed and operative in accordance with an embodiment of the invention.
Figure 1B:
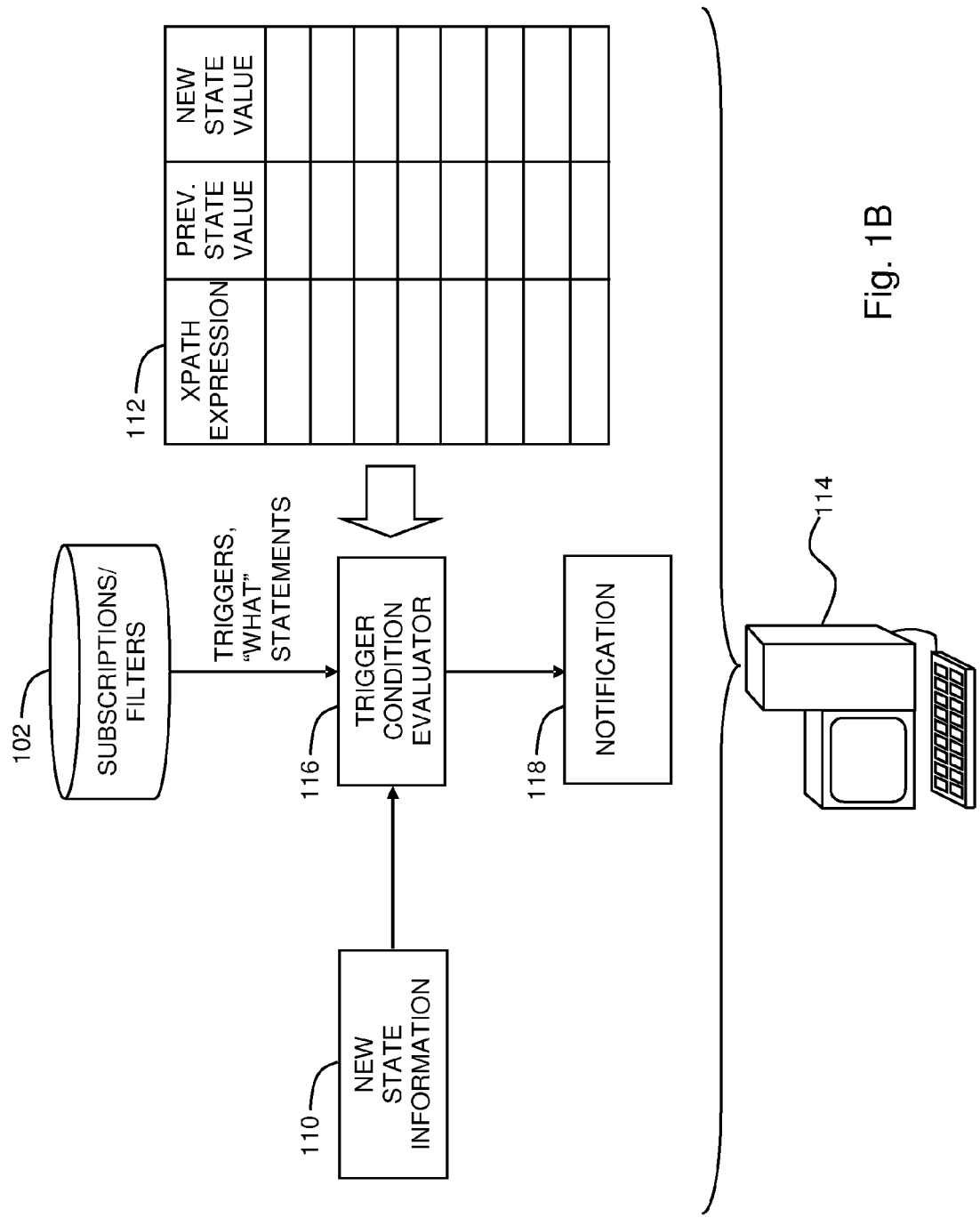

Reference is now made to FIGS. 1A and 1B, which, taken together, is a simplified conceptual illustration of a system for processing triggering rules in SIP event notification filters, constructed and operative in accordance with an embodiment of the invention. In the system of FIG. 1A an XPath processor 100 collects a set 102 of XPath expressions from all the triggers of all SIP event notification filters of all subscribers in a set of subscribers who are subscribed to state information of a particular resource. XPath processor 100 creates a merged finite state automaton 104 whose nodes and transitions collectively represent the combination of all of the XPath expressions. A streaming parser 106, such as a SAX parser, parses previously-published state information 108 of the resource, such as an XML document containing the resource's state information, as well as newly-published state information 110 of the resource. Parser 106 streams parsing events to XPath processor 100 which employs automaton 104 to perform a streaming evaluation of all of the XPath expressions in parallel to determine which node(s) (e.g., element, attribute, text) in the parsed XML document satisfies which XPath expressions as represented by automaton 104. The results of the evaluation of all of the XPath expressions, which is, in a non-limiting embodiment, expressed as a table 112, include two sets of values, such as XML node or attribute values, that correspond to the values of interest to each trigger in both the previously-published and newly-published state information. Table 112 includes, in a non-limiting embodiment, an indicator (not shown), such as a null value, which indicates that no node in the parsed XML document satisfies a given XPath expression.

Referring now to FIG. 1B, a trigger condition evaluator 116 evaluates each trigger condition of the subscription's filter against the values that are associated with the trigger. If the values are such that the trigger condition is met, or that multiple trigger conditions are met if multiple triggers are all required to be met, then the filter's "what" statements are acted upon in accordance with conventional techniques in order to compose a notification 118 from the resource's new state information 110.

Any of the elements shown in FIGS. 1A and 1B are preferably executed by or otherwise accessible to a computer 114, such as by implementing any of the elements shown in FIGS. 1A and 1B in computer hardware or in computer software embodied in a computer storage medium.

Figure 2:
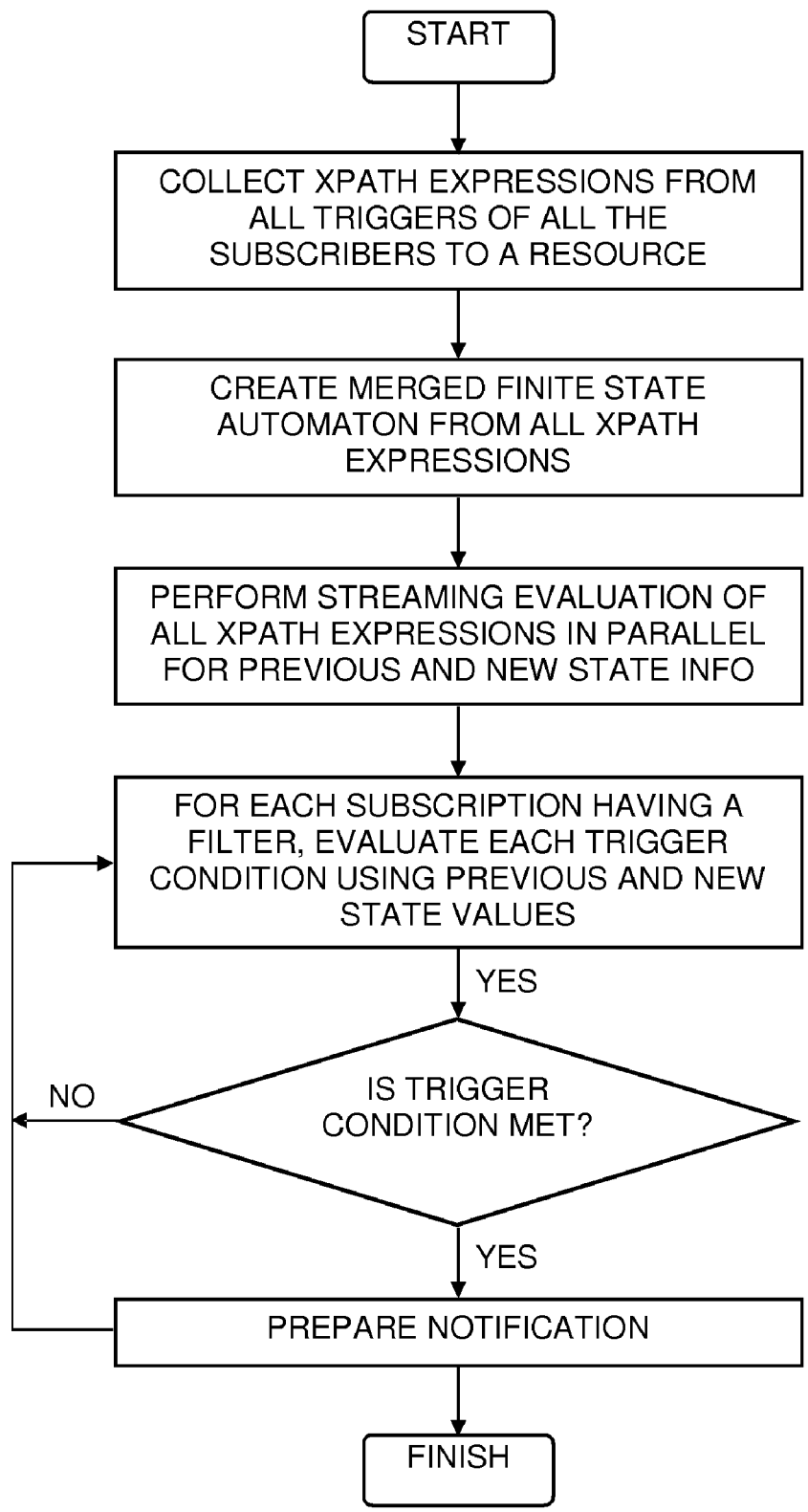
FIG. 2 is a simplified flowchart illustration of an exemplary method of operation of the system of FIGS. 1A and 1B, operative in accordance with an embodiment of the invention.

Reference is now made to FIG. 2, which is a simplified flowchart illustration of an exemplary method of operation of the system of FIGS. 1A and 1B, operative in accordance with an embodiment of the invention. In the method of FIG. 2, which is, in a non-limiting embodiment, performed by computer 114 (FIGS. 1A and 1B), the XPath expressions are collected from all triggers of all SIP event notification filters of all subscribers in a set of subscribers who are subscribed to state information of a particular resource. A merged finite state automaton is then created whose nodes and transitions collectively represent the combination of all of the XPath expressions. A streaming evaluation of all of the XPath expressions is performed in parallel as applied to previously-published state information and newly-published state information of a resource, resulting in two values for each XPath expression, one from the previous state information and one from the new state information. Each subscription is then processed by evaluating each trigger condition of the subscription's filter against the two values that are associated with the trigger. Thus, for example, given a trigger that is activated when a changed state condition is detected, the condition is met if the previous and new state values are different. The filter's "what" statements are, in a non-limiting embodiment, then acted upon in accordance with conventional techniques in order to compose the notification. Given a trigger that is activated when a state element has been added, the condition is met if the value in the previously-published state information is null and the corresponding value in the newly-published state information is not null. Given a trigger that is activated when a state element has been removed, the condition is met if the value in the previously-published state information is not null and the corresponding value in the newly-published state information is null.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

What is claimed is:

1. A system for processing triggering rules in Session Initiation Protocol (SIP) event notification filters, the system comprising:
    an XPath processor configured to
    collect a set of XPath expressions from at least one trigger of at least one SIP event notification filter of at least one subscriber in a set of subscribers who are subscribed to state information of a resource, and
    create a merged finite state automaton having a plurality of nodes and transitions that collectively represent the combination of said XPath expressions; and
    a processor for executing a streaming parser configured to
    parse previously-published state information of said resource and newly-published state information of said resource, and
    stream parsing events of said parsed information to said XPath processor,
    wherein said XPath processor is configured to employ said automaton to perform a streaming evaluation of said XPath expressions in parallel to determine which nodes of said parsed information satisfies any of said XPath expressions represented by said automaton;
    wherein any of said published state information is published in an Extensible Markup Language (XML) document; and
    wherein said XPath processor is configured to derive a value from either of said previously-published state information and said newly-published state information, said value being associated with said any of said XPath expressions.

2. A system according to claim 1 wherein said streaming parser is a Simple API for XML (SAX) parser.

3. A system according to claim 1 wherein either of said XPath processor and said streaming parser are executable by a computer.

4. A system according to claim 1 wherein either of said XPath processor and said streaming parser are implemented in either of a) computer hardware and b) computer software embodied in a computer-readable medium.

5. A system for processing triggering rules in Session Initiation Protocol (SIP) event notification filters, the system comprising:
    an XPath processor configured to
    collect a set of XPath expressions from at least one trigger of at least one SIP event notification filter of at least one subscriber in a set of subscribers who are subscribed to state information of a resource, and
    create a merged finite state automaton having a plurality of nodes and transitions that collectively represent the combination of said XPath expressions;
    a processor for executing a streaming parser configured to
    parse previously-published state information of said resource and newly-published state information of said resource, and
    stream parsing events of said parsed information to said XPath processor,
    wherein said XPath processor is configured to employ said automaton to perform a streaming evaluation of said XPath expressions in parallel to determine which nodes of said parsed information satisfies any of said XPath expressions represented by said automaton, and
    wherein said XPath processor is configured to derive a value from either of said previously-published state information and said newly-published state information, said value being associated with said any of said XPath expressions; and
    a trigger condition evaluator configured to
    evaluate, for any of said filters, all of said values of all of said trigger conditions that determine whether a notification is to be sent, and
    compose and send said notification if said evaluated trigger conditions are met.

6. A system according to claim 5 wherein any of said XPath processor, said streaming parser, and said trigger condition evaluator are executable by a computer.

7. A system according to claim 5 wherein any of said XPath processor, said streaming parser, and said trigger condition evaluator are implemented in either of a) computer hardware and b) computer software embodied in a non-transitory computer storage medium.

8. A method for processing triggering rules in Session Initiation Protocol (SIP) event notification filters, the method comprising:
    collecting a set of XPath expressions from at least one trigger of at least one SIP event notification filter of at least one subscriber in a set of subscribers who are subscribed to state information of a resource;
    creating a merged finite state automaton having a plurality of nodes and transitions that collectively represent the combination of said XPath expressions;
    parsing previously-published state information of said resource and newly-published state information of said resource; and
    employing said automaton to perform a streaming evaluation of said XPath expressions in parallel, using a processor, to determine which nodes of said parsed information satisfies any of said XPath expressions represented by said automaton,
    wherein said employing step comprises deriving a value from either of said previously-published state information and said newly-published state information, said value being associated with said any of said XPath expressions, and
    wherein any of said published state information is published in an Extensible Markup Language (XML) document.

9. A method according to claim 8 and further comprising determining whether any of said values that are associated with any of said triggers meet a condition of said trigger.

10. A method according to claim 9 and further comprising composing a notification if said condition is met.

11. A computer program embodied on a non-transitory computer storage medium, the computer program comprising:
- a first code segment operative to collect a set of XPath expressions from at least one trigger of at least one Session Initiation Protocol (SIP) event notification filter of at least one subscriber in a set of subscribers who are subscribed to state information of a resource;
- a second code segment operative to create a merged finite state automaton having a plurality of nodes and transitions that collectively represent the combination of said XPath expressions;
- a third code segment operative to parse previously-published state information of said resource and newly-published state information of said resource;
- a fourth code segment operative to employ said automaton to perform a streaming evaluation of said XPath expressions in parallel to determine whether any nodes of said parsed information satisfies any of said XPath expressions represented by said automaton; and
- a fifth code segment operative to derive a value from either of said previously-published state information and said newly-published state information, said value being associated with said any of said XPath expressions,
- wherein any of said published state information is published in an Extensible Markup Language (XML) document.

12. A computer program according to claim 11 and further comprising a sixth code segment operative to determining whether any of said values that are associated with any of said triggers meet a condition of said trigger.

13. A computer program according to claim 12 and further comprising a seventh code segment operative to compose a notification if said condition is met.

* * * * *